Sept. 26, 1939.  C. J. MALM  2,173,945
PREPARATION OF MIXED FATTY ACID ESTERS OF CELLULOSE
Filed April 12, 1938
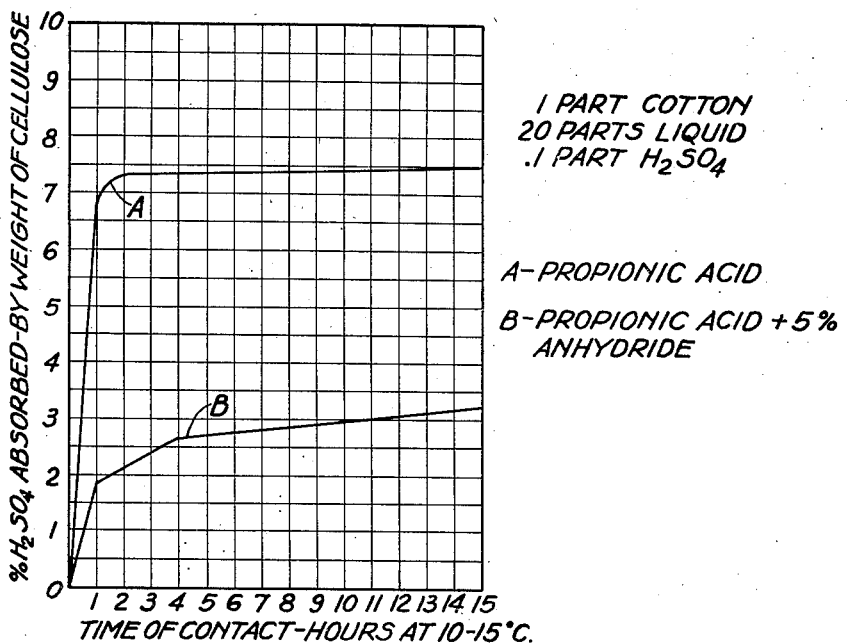
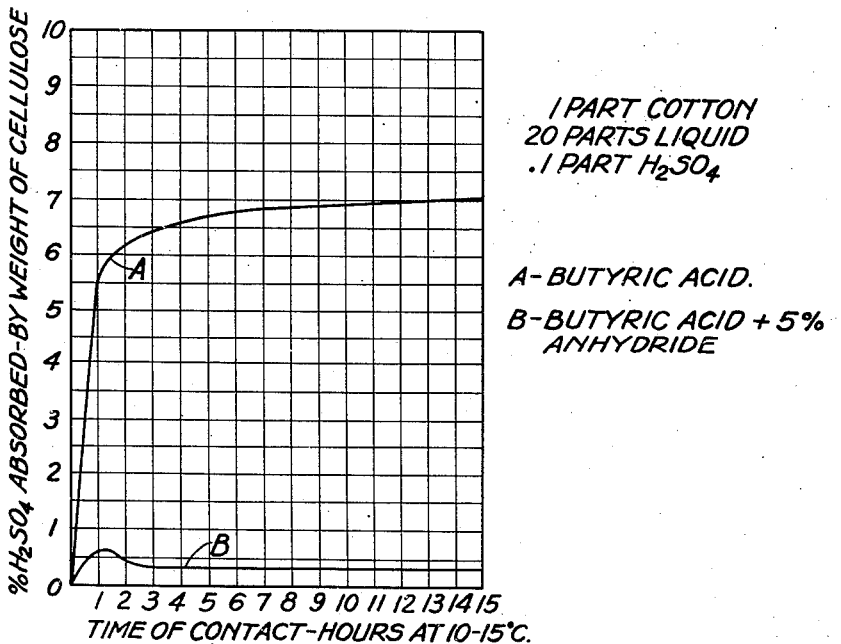

Patented Sept. 26, 1939

2,173,945

UNITED STATES PATENT OFFICE 2,173,945

PREPARATION OF MIXED FATTY ACID ESTERS OF CELLULOSE

Carl J. Malm, Rochester, N. Y., assignor to Eastman Kodak Company, Rochester, N. Y., a corporation of New Jersey Application April 12, 1938, Serial No. 201,541

8 Claims. (Cl. 260—225)

This invention relates to the preparation of cellulose acetate propionate or cellulose acetate butyrate of at least 10% of propionyl or butyryl by subjecting the cellulose employed in its preparation to the action of propionic or butyric acid and sulfuric acid at a low temperature prior to the esterification step.

In the making of cellulose acetate propionate or cellulose acetate butyrate in which an appreciable proportion of propionyl or butyryl is used it is very difficult to obtain a rapid and uniform esterification. I have found that this difficulty is caused by the low swelling action of propionic and butyric acids upon the cellulose and the low absorption of sulfuric acid by the cellulose from a solution of sulfuric acid in propionic or butyric acid in the presence of a fatty acid anhydride.

The proportion of catalyst absorbed by the cellulose determines the rate of esterification and the poor absorption of catalyst by the cellulose under the conditions previously employed has markedly decreased that rate.

An object of my invention is to provide a process for preparing cellulose acetate propionate or cellulose acetate butyrate in which the reaction proceeds uniformly and is completed within a short time. Other objects of my invention will appear herein.

My invention is carried out in such a way that the cellulose absorbs sufficient sulfuric acid that the esterification proceds at a rapid rate but degradation of the cellulose is negligible. For instance the cellulose may be thoroughly penetrated by acetic acid and then after lowering the temperature is treated with a solution of sulfuric acid in fatty acid of 3-4 carbon atoms, in the absence of acid anhydride. A small amount of acetic acid is permissible but it is ordinarily preferred that no further acetic acid be added; as otherwise a large amount of propionyl or butyryl may be necessary to maintain the proper proportions of acyl groups in the esterification. The temperature of treatment with the solution of sulfuric acid in propionic or butyric acid should be below 60° F. the range of 40°–60° F. usually being suitable. The temperature should be below that at which degradation of the cellulose by the catalyst is objectionable or in other words, the degradation of the cellulose should be negligible at the temperature used.

The attached drawings are graphic representations of the absorption of sulfuric acid by cotton cellulose from propionic acid (or butyric) at the temperatures which are ordinarily present in esterification processes both in the presence and in the absence of lower fatty acid anhydride whether it be acetic, propionic or butyric. Figure I shows graphically the amount of sulfuric acid absorbed by cotton cellulose from a propionic acid solution of sulfuric acid both in the absence of lower fatty acid anhydride and where 5% of anhydride is present. Figure II is based on a similar set-up using butyric instead of propionic acid. The proportions of liquid and of catalyst relative to the cellulose are given on the drawing.

It may be seen by reference to the drawings that 1-2 hours treatment of the cellulose with the solution of sulfuric acid in propionic or butyric acid is ordinarily sufficient. It may also be seen that with anhydride present, the absorption is poor and that increase of the time of contact does not compensate for the presence of anhydride.

An increase in the amount of catalyst absorbed increases the swelling of the fibers, accelerates the reaction time and improves the uniformity of the esterification. Thus it may be seen from these drawings that where the anhydride and catalyst are added at the same time that these advantages will be absent due to the comparatively low absorption of catalyst by the cellulose.

My process is especially valuable with a large quantity of catalyst such as is ordinarily employed in making high viscosity esters such as 4-20% based on the weight of the cellulose. By my process in using large proportions of catalyst, the cellulose is protected from degradation and the process proceeds at a rapid rate.

My process is adapted for preparing cellulose acetate propionate or acetate butyrate containing at least 10% of propionyl or butyryl and preferably 15-20% or more. To obtain these esters it is necessary that at least 20% of the total acyl of the esterification bath be fatty acid groups of 3-4 carbon atoms. As acetic anhydride is employed usually for the esterifying anhydride due to its cheapness and as the cellulose is ordinarily presoaked in acetic acid as a preliminary activating treatment it may be seen that substantial quantities of propionic or butyric acid are necessary in the esterification bath especially if the presence of more than the minimum of propionyl or butyryl is desired.

In processes embodying my invention the practice described and claimed in my application Serial No. 73,138, filed April 7, 1936, may also be included such as by refrigerating the anhydride addition prior to mixing it with the pretreated cellulose. The details of refrigerating and the practice in such case are given in that application and they may readily be adapted to include my present invention.

Although the addition of all of the esterification catalyst before the anhydride addition is permissible in processes in accordance with my invention, if desired only part, such as one-half, of the catalyst might be added at this time and the remainder to be employed may then be added with the anhydride.

Processes of this nature which may be adapted for use with my invention are described in Malm and Blanchard application Serial No. 192,647, filed February 25, 1938, which has matured into Patent No. 2,140,639.

The following example illustrates a process embodying my invention:

400 lbs. of cotton linters were presoaked with 960 lbs. of acetic acid at 130° C. for 1 hour. 675 lbs. of propionic acid were added and the mass was cooled to 50° C. This addition of propionic acid prevents the solidifying of the acetic acid at the lowered temperature. A mixture of 200 lbs. of propionic acid and 6000 cc. of sulfuric acid was added and the mass was kept at 50° F. for 2 hours. A mixture of 1075 lbs. of 95% acetic anhydride, 1100 lbs. of propionic acid and 2000 cc. of sulfuric acid, which had been previously cooled, was added and the reaction began. The temperature was allowed to reach a maximum of 80° F. Two hours after the addition of the anhydride a very viscous brilliant solution, free from grain and fibers, was obtained.

The ester may then be precipitated from the reaction mixture or if desired it may be subjected to hydrolysis such as by the method described and claimed in Malm and Fletcher Patent No. 2,026,583.

The cellulose esters prepared in accordance with my invention are adapted for various commercial uses particularly where a product of high clarity is desired, such as in laminated or safety glass or in photographic film base. Sheeting may be made from these esters by coating out from solution such as from acetone, propylene chloride-lower alcohol, ethylene chloride, ethylene chloride-alcohol or any volatile solvent in which they are soluble. If desired a plasticizer may be incorporated therein.

As a rule the esters prepared in accordance with my invention have a colloid value of at least 70% and the description of high colloid value esters found in Malm and Fletcher application Serial No. 9,024 filed March 2, 1935, is generally applicable to the esters prepared in accordance with my invention.

My invention may be readily employed in conjunction with the process described and claimed in my application Serial No. 168,966 filed October 17, 1937 which has matured into Patent No. 2,150,690. After the cellulose has been activated with acetic acid without catalyst by the method described in that application it may then be mixed with propionic or butyric acid, cooled and then treated with a solution of catalyst in propionic or butyric acid such as for 1–2 hours, immediately prior to the esterification.

It is to be understood that a mixture of propionic and butyric acids might be employed whereby a cellulose acetate propionate butyrate would result. My invention, by increasing the swelling of the fibers and the susceptibility to esterification, is of value where the more sluggish propionic or butyric anhydride is employed to impel the esterification of the cellulose after it has been treated.

The term "presoaking" as employed herein with reference to the treatment of cellulose is to be understood as referring to the treatment of cellulose with a lower fatty acid particularly acetic acid in the absence of catalyst.

It is to be understood that the pretreatments described are preferably carried out in the substantial absence of water; that is the fatty acids employed are highly concentrated and the cellulose which is treated contains not more than 5% and preferably not more than 2% of moisture. If perchance the moisture content is higher than desired some anhydride, but not more than will combine with the water present, can be added.

I claim:

1. A process for preparing a mixed ester of cellulose containing acetyl and fatty acid groups of 3–4 carbon atoms which comprises presoaking cellulose with acetic acid, adding fatty acid of 3–4 carbon atoms, cooling the mass to a temperature of not more than 60° F. but not to a point where solidification of the liquid occurs, adding an ahydride-free solution of sulfuric acid in a fatty acid of 3–4 carbon atoms and maintaining the mass at a temperature of 40°–60° F. for a short time and subsequently adding an impelling anhydride and esterifying the cellulose, the bath containing at least 20% of propionyl or butyryl based on the total acyl content of the bath.

2. In the preparation of cellulose esters containing acetyl and fatty acid groups of 3–4 carbon atoms, the latter comprising at least 10%, in which cellulose is esterified in a bath containing acetyl and fatty acid groups of 3–4 carbon atoms, the steps which comprise treating the cellulose with acetic acid in the absence of catalyst, and subsequently treating the cellulose with an anhydride-free solution of sulfuric acid in a fatty acid of 3–4 carbon atoms at a non-solidifying temperature of not more than 60° F.

3. In the preparation of cellulose esters containing acetyl and propionyl, the latter comprising at least 10%, in which cellulose is esterified in a bath containing acetyl and propionyl, the steps which comprise treating the cellulose with acetic acid in the absence of catalyst, and subsequently treating the cellulose with an anhydride-free solution of sulfuric acid in propionic acid at a non-solidifying temperature of not more than 60° F.

4. In the preparation of cellulose esters containing acetyl and butyryl, the latter comprising at least 10%, in which cellulose is esterified in a bath containing acetyl and propionyl, the steps which comprise treating the cellulose with acetic acid in the absence of catalyst, and subsequently treating the cellulose with an anhydride-free solution of sulfuric acid in butyric acid at a non-solidifying temperature of not more than 60° F.

5. In the preparation of cellulose esters containing acetyl and fatty acid groups of 3–4 carbon atoms, the latter comprising at least 10%, in which cellulose is esterified in a bath containing acetyl and fatty acid groups of 3–4 carbon atoms, the steps which comprise contacting cellulose in attenuated form with ¼–2 parts of catalyst-free acetic acid, allowing it to stand for a time in an enclosed container, cooling the mass to a non-solidifying temperature of not more than 60° F., adding an anhydride-free solution of sulfuric acid in a fatty acid of 3–4 carbon atoms and maintaining at the lowered temperature until sufficient sulfuric acid has been absorbed by the cellulose to assure its rapid and uniform esterification upon treating with lower fatty acid anhydride.

6. In the preparation of cellulose esters containing acetyl and fatty acid groups of 3–4 carbon atoms, the latter comprising at least 10%, in which cellulose is esterified in a bath containing acetyl and fatty acid groups of 3–4 carbon atoms, the steps which comprise treating the cellulose with acetic acid at a temperature of approximately 130° F. for about one hour, adding fatty acid of 3–4 carbon atoms, cooling the mass to a non-solidifying temperature of not more than 60° F. and subsequently treating the cellulose with an anhydride-free solution of sulfuric acid in a fatty acid of 3–4 carbon atoms at said temperature.

7. In the preparation of cellulose esters containing acetyl and fatty acid groups of 3–4 carbon atoms, the latter comprising at least 10%, in which cellulose is esterified in a bath containing acetyl and fatty acid groups of 3–4 carbon atoms, the steps which comprise treating the cellulose with acetic acid in the absence of catalyst, and subsequently treating the cellulose with an anhydride-free solution of a portion of the sulfuric acid which is to be employed in the esterification in a fatty acid of 3–4 carbon atoms at a non-solidifying temperature of not more than 60° F.

8. In the preparation of cellulose esters containing acetyl and fatty acid groups of 3–4 carbon atoms, the latter comprising at least 10%, in which cellulose is esterified in a bath containing acetyl and fatty acid groups of 3–4 carbon atoms, the steps which comprise treating the cellulose with acetic acid in the absence of catalyst, and subsequently treating the cellulose with an anhydride-free solution of approximately half the sulfuric acid which is to be employed in the esterification in a fatty acid of 3–4 carbon atoms at a non-solidifying temperature of not more than 60° F.

CARL J. MALM.